April 13, 1948. R. B. ENGDAHL 2,439,723
FLOW METER
Filed Jan. 12, 1946

INVENTOR
Richard B. Engdahl

BY R. R. Adams
M. B. Lilly
Agents

Patented Apr. 13, 1948

2,439,723

UNITED STATES PATENT OFFICE 2,439,723

FLOWMETER

Richard B. Engdahl, Columbus, Ohio, assignor, by mesne assignments, to Bituminous Coal Research, Inc., Pittsburgh, Pa., a corporation of Delaware Application January 12, 1946, Serial No. 640,904

2 Claims. (Cl. 73—196)

This invention relates to methods of and apparatus for measuring the flow of finely divided solid materials in a gaseous medium and, as a particular application thereof, may be exemplified by the measurement of powdered coal being delivered by a blower.

It is a well-known phenomenon of physics that the rate of flow of a fluid may be determined by passing the fluid through an orifice of known dimensions. The problem of developing means for measuring or metering the amount of powdered material suspended in a gas, however, has been attacked from many angles, but to date no successful method or apparatus has been developed. A definite need for such meters exists, particularly in the powdered fuel and pulverized catalyst processes, wherein the amount of powdered solid material must be closely regulated. In the absence of metering devices, it is essential to make all line adjustments by hand, because the amount of powdered material delivered to a burner, in the case of powdered coal, or to a reaction chamber in the case of a powdered catalyst, cannot be ascertained when more than one delivery line is branched off of the main supply. This necessity for manual adjustment prevents predetermination of operation and necessitates the constant vigilance of a workman to maintain the process under operating conditions. An object of this invention is to provide a method and apparatus for measuring the amount of finely divided solid material in a gaseous medium.

Figure 1:
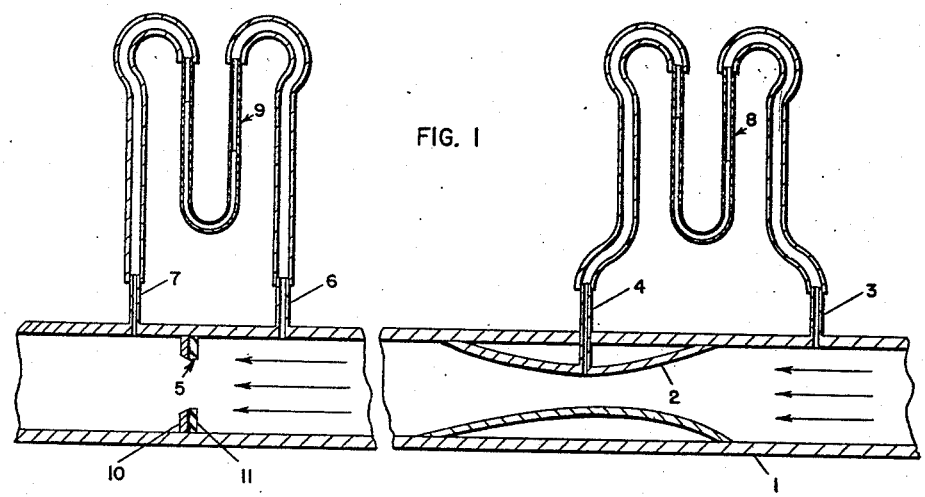
Figure 2:
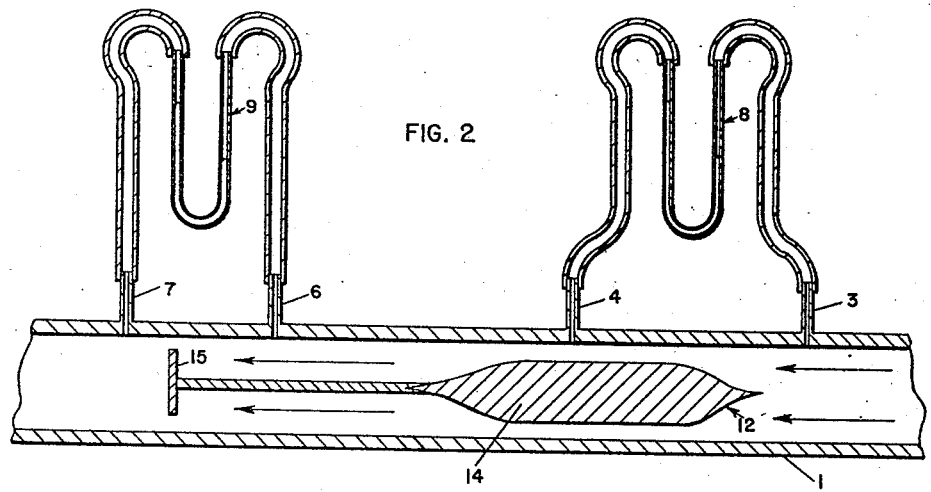
Figure 3:
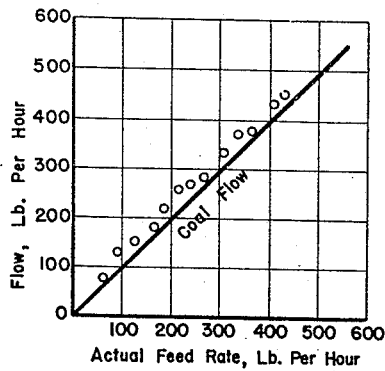

Other objects and advantages of the present invention will become apparent from the following detailed description thereof when read in conjunction with the accompanying drawings, in which Figure 1 is a schematic cross-sectional view of a meter illustrating the present invention, Figure 2 is a schematic cross-sectional view showing a modification of the device shown in Figure 1, and Figure 3 is a graph representing the variation between actual feed rate and the calculated feed rate of a given powdered material.

It has been discovered that the pressure drop effected by an elongated restriction, such as a nozzle, interposed in a line through which is passed a finely divided solid suspended in a gas (hereinafter referred to as a solid-gas mixture) is directly related to and furnishes an accurate indication of the total solid-gas mixture flowing therethrough. By employing any well-known means for measuring the amount of gas in the solid-gas mixture and comparing those data with those obtained by use of the nozzle, the amount of solid flowing through a conduit may be determined.

In order to more clearly describe the present invention, reference is made to Figure 1 of the accompanying drawings which discloses a particular application thereof. In Figure 1 the solid-gas mixture enters from the right, passes through the pipe 1, and exits at the left as indicated by the arrows. A nozzle 2, shown in the form of a venturi, is positioned within the pipe as shown. A pressure tap 3 is positioned along the pipe 1 far enough ahead of the venturi 2 to obviate any pressure effects of the restriction. A second pressure tap 4 is positioned toward the middle of the venturi 2 so that the differential between the upstream pressure as measured at the pressure tap 3, and the diminished pressure, as measured at the tap 4, may be registered on a manometer 8 schematically shown. It is not essential to this invention that a venturi be employed to measure the amount of solid-gas mixture flowing through pipe 1, since any nozzle will provide the desired data. The length of such nozzle has not been found to be particularly critical, and a nozzle having a length about equal to its diameter has been found to function satisfactorily. It is preferred, however, to employ a venturi or similarly shaped restriction because this construction permits the pressure drop to be regained. An orifice, indicated in general at 5, is employed in the customary manner to measure the rate of flow of gas through the pipe 1 by means of the pressure differential between the upstream pressure tap 6 and the low pressure tap 7, which is indicated by the manometer 9. The present orifice 5, shown in Figure 1, differs from that usually employed merely to measure the gas flow through a pipe in that a rubber-like layer 11 is disposed upon the surface of a backplate 10. An orifice having this particular construction is described in the copending application by H. Maurice Carlson entitled "Orifice plates," Serial No. 640,933, filed January 12, 1946. As disclosed in the above referred to application, the rubber-like layer 11 upon the surface of the plate 10 prolongs the life of the orifice and prevents a build up of the solid materials carried by the gaseous medium around the opening in the orifice 5 on the upstream side which otherwise would affect the pressure differential between the taps 6 and 7.

The modification shown in Figure 2 is identical with Figure 1 except for the construction of the elongated restriction and the orifice, which are produced by positioning a core, shown in general at 12, in a rigid position in the center of the pipe 1 by means of guide wires (not shown). Instead of forcing the gas through a narrowed constriction in the center of the pipe, as is done in Figure 1 by the venturi 2, the forepart 14 of the core 12 guides the gas toward the outside of the pipe and forms an annular restriction through which the solid-gas mixture is forced to pass. Similarly the circular disc 15 positioned at the opposite end of the core 12 from the forepart 14 provides an annular orifice which performs the same function as the orifice 5 in Figure 1.

Although both Figures 1 and 2 show the orifice is positioned behind the nozzle, it is immaterial for purposes of this invention whether the orifice is positioned on the upstream or downstream side of the nozzle. It is also obvious that any other suitable means of measuring the gas flow may be adopted if so desired.

The weight of coal ($W_c$) or other powdered ingredient passing through the pipe 1 at any given instant may be determined in the following manner. In accordance with well-known principles, the weight of gas ($W_a$) flowing through the orifice 5 at any given instant may be determined by multiplying the constant ($K_0$) of the orifice by the square root of the pressure drop ($N_0$) indicated by the manometer 9. This is represented by the following equation:

$$(1) \qquad W_a = K_0 \sqrt{N_0}$$

The orifice measurements only reflect the amount of gas flowing therethrough and are not affected by the presence of a solid mixed into the gas. As above noted, however, it has been discovered that an elongated restriction, such as a venturi, may be employed to measure the total solid-gas mixture passing through it. Thus, the apparent weight rate of flow of solid-gas mixture ($W_{ap}$) may be determined by the pressure drop ($N_m$) across the pressure taps 3 and 4 as indicated by the manometer 8:

$$(2) \qquad W_{ap} = K_m \sqrt{N_m}$$

The apparent rate of solid-gas flow ($W_{ap}$) derived from Equation 2 is greater than the rate of air flow ($W_a$) determined by Equation 1, because of the presence of the solid particles carried in suspension by the gas. It is believed that the presence of the solid particles increases the pressure drop across an elongated restriction due to the fact that energy which otherwise would create pressure against the walls of the pipe 1 is translated into forward motion of the solid particles as they gain speed on the way through the elongated restriction or venturi 2. The apparent rate of flow ($W_{ap}$) of solid-gas mixture, as determined by Equation 2, does not accurately represent the weight rate of flow of solid-gas mixture through the pipe because $N_m$ is recorded in feet of gas and not in feet of solid-gas mixture; therefore, it is necessary to multiply $N_m$ by the ratio $$\frac{W_c + W_a}{W_a}$$

which ratio represents the relationship of the solid-gas density to the density of the gas alone. By so modifying $N_m$ in Equation 2, the apparent rate of flow ($W_{ap}$) becomes the actual weight of solid ($W_c$) plus the weight of gas ($W_a$) flowing per unit of time through the pipe 1:

$$(3) \qquad W_c + W_a = K_m \sqrt{\frac{N_m(W_c + W_a)}{W_a}} = W_{ap}\sqrt{\frac{W_c + W_a}{W_a}}$$

Thus, $$(4) \qquad (W_c + W_a)^2 = W_{ap}^2 \frac{(W_c + W_a)}{W_a}$$

Solving for the weight of coal ($W_c$) passing through the pipe, the following equation is obtained:

$$(5) \qquad W_c = \frac{W_{ap}^2}{W_a} - W_a$$

In Figure 3 the data obtained by passing pulverized coal through a pipe are charted, the abscissa being the actual feed rate of coal in pounds per hour and the ordinate being the calculated flow or feed rate in pounds per hour of the coal calculated according to Equation 5. It is apparent that, if the calculated rate of coal flowing through the pipe were exactly equal to the actual weight of coal fed into the pipe, that the points placed thereon would form a straight line positioned at a 45° angle, as indicated by the line marked "coal flow" on the graph. The circular points plotted on the graph representing individual runs indicate how closely the calculated rate of flow approximates the actual rate of flow of coal through the pipe. This accuracy may be maintained within 5 to 10% and, upon perfection of the technique and calibration of particular apparatus for a particular job, even this small percentage of error may be drastically reduced.

Meters formed according to the present invention may be adapted to varied uses. It is obvious that by accurately determining the amount of coal supplied per burner, or the amount of catalyst supplied to a reaction chamber, the process can be made much more economical. Furthermore, such meters can be made to operate automatic control devices, thus eliminating the necessity of skilled workmen and obviating variances that might otherwise be introduced by even the most vigilant operator. Heretofore, it has been impossible to determine the amount of powdered material passing through a supply line at any given moment by metering means. The present invention, thus, is advantageous in that it provides an additional tool for research in connection with solid-gas mixtures.

A number of variations and modifications of the present invention will become apparent to those skilled in the art. For example, liquid or semi-liquids rather than solids may be suspended in gaseous medium and their amounts determined by the present invention. Furthermore, certain liquid-solid mixtures may lend themselves to measurement according to the method of the present invention.

The mechanical details disclosed in the accompanying drawings are, of course, purely schematic and may be widely varied.

What is claimed is:

1. A meter for measuring the weight rate of flow of solid in a solid-fluid mixture, comprising a conduit, an elongated restriction and an orifice plate arranged in said conduit in spaced relation and both so positioned in said conduit that the solid-fluid mixture passes serially therethrough, and means for measuring the pressure drop across said restriction and said orifice, respectively.

2. A method for measuring the weight rate of flow in a conduit of the solid in a solid-fluid mixture, comprising the steps of measuring the pressure drop across an elongated restriction and across an orifice plate which are positioned in the conduit, whereby the weight rate of flow of solid may be computed according to the equation $$W_c = \frac{W_{ap}^2}{W_a} - W_a$$

wherein $W_c$ equals the weight of solid in the solid-fluid mixture, $W_{ap}$ is the apparent rate of gas flow determined at the restriction, and $W_a$ is the rate of gas flow determined at the orifice.

RICHARD B. ENGDAHL.

REFERENCES CITED

The following references are of record in the file of this patent:

UNITED STATES PATENTS

| Number | Name | Date |
|---|---|---|
| 1,530,222 | Weymouth et al. | Mar. 17, 1925 |
| 1,677,691 | Smith | July 17, 1928 |
| 1,963,011 | Albersheim et al. | June 12, 1934 |
| 2,065,695 | Haultain | Dec. 29, 1936 |
| 2,311,848 | Luhrs | Feb. 23, 1943 |

FOREIGN PATENTS

| Number | Country | Date |
|---|---|---|
| 558,231 | Germany | Sept. 2, 1932 |